Nov. 12, 1935. W. L. McLAUGHLIN ET AL 2,020,369
STEAM GENERATOR AND MEANS FOR PROMOTING
THE CIRCULATION OF THE LIQUID THEREIN
Original Filed June 30, 1932

Inventors:
Wilson L. McLaughlin, Dec'd.
by Henry B. Lewis, Admr. &
Herrold L. McLaughlin &
Virg Ballou
BY
M. Falbert Dick
ATTORNEY.

Patented Nov. 12, 1935

2,020,369

UNITED STATES PATENT OFFICE 2,020,369

STEAM GENERATOR AND MEANS FOR PROMOTING THE CIRCULATION OF THE LIQUID THEREIN

Wilson L. McLaughlin, deceased, late of Des Moines, Iowa, by Henry B. Lewis, administrator, Des Moines, Iowa, and Herrold L. McLaughlin and Virg Ballou, Des Moines, Iowa; said Herrold L. McLaughlin and said Virg Ballou assignors of their entire right to National Pure Water Corporation, Des Moines, Iowa, a corporation of Iowa Original application June 30, 1932, Serial No. 620,080. Divided and this application November 23, 1933, Serial No. 699,319½

4 Claims. (Cl. 122—182)

The principal object of this invention is to provide a means for circulating liquid in a steam generator, boiler or the like.

A further object of our invention is to provide a circulating system for steam generators, boilers and the like that will effectively keep the liquid, contained in said steam generator or boiler, circulating, and at the same time increase the heat unit component in said liquid.

A still further object of the invention is to provide steam boiler or the like that is capable of producing a maximum amount of steam in a minimum length of time and with a minimum amount of fuel.

A still further object of our invention is to provide a circulation system for steam generators or the like that will continuously circulate the water or liquid being reduced to steam, and at the same time absorb the maximum amount of heat from a combustion chamber and transmit the same to the water or liquid concurrently with its circulatory function, thereby making for efficiency and the elimination of the possibility of warping or burning out of the hot gas flues in said steam generator or the like.

A still further object of this invention is to provide a steam generator and means for promoting circulation therein that is economical and durable in use.

These and other objects will be apparent to those skilled in the art.

Our invention consists in the construction, arrangement, and combination of the various parts of the device, whereby the objects contemplated are attained as hereinafter more fully set forth, pointed out in our claims and illustrated in the accompanying drawing, in which:

This application is a division of our pending application filed in the Patent Office June 30, 1932, Serial No. 620,080 on a steam generator.

It has always been desired that the efficiency of steam generators, boilers and the like be increased. In order that a steam generator be efficient it is necessary that the lowest ratio exist between the heat units supplied and the heat units imparted into the water or like liquid being reduced to steam. To approach the criterion in steam boilers or the like it is necessary that the water or liquid be circulated in the boiler in order to keep it flowing near the source of heat and to keep the heat increase uniform so that heat flues, chambers and the like will not warp from the variance in temperatures. Due to the fact that our means of circulating water in a steam generator or the like is constant and at the same time imparts additional units of heat to the liquid it is highly desirable that it be used whenever the highest amount of efficiency and economy is desired.

Figure 1:
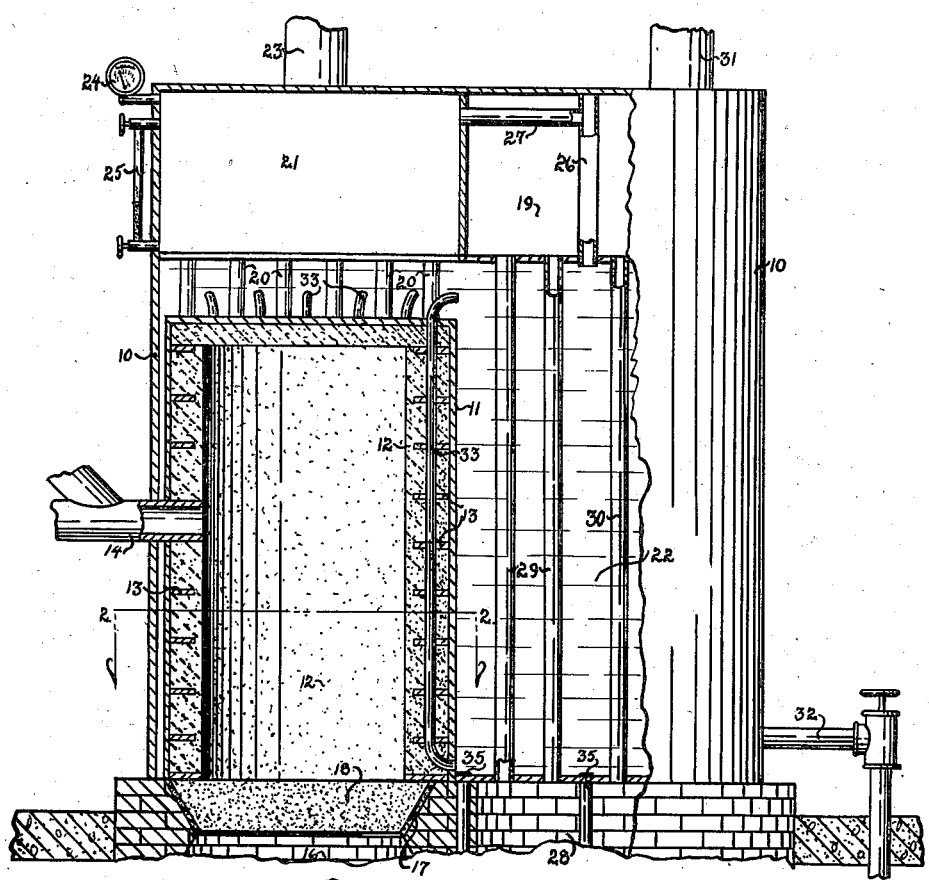
Fig. 1 is a side sectional view of our steam generator installed and ready for use.
Figure 2:
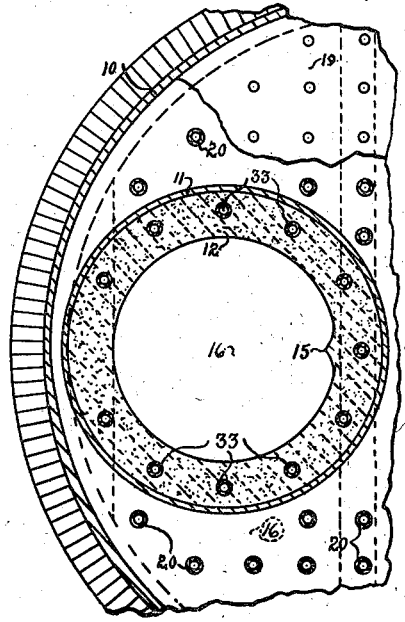
Fig. 2 is a cross sectional view of a portion of our upright steam generator taken on line 2—2 of Fig. 1 and more fully illustrates the interior construction of the combustion chamber and circulatory pipes.

We have used the numeral 10 to generally designate the steam boiler housing. The numeral 11 designates the outer circular shell of the combustion chamber inside and resting on the floor of the boiler housing proper and open at its bottom, as shown in Fig. 1. This combustion chamber is much less in height than the height of the boiler housing and has an outside diameter much less than the inside diameter of the housing. The numeral 12 designates a refractory lining on the inside of the shell 11. The numeral 13 designates a plurality of circular supporting and reinforcing flanges embedded in the refractory lining 12 and secured by any suitable means to the inside of the shell 11. The numeral 14 designates the fuel inlet pipe having one of its ends in communication with a source of suitable fuel and its other end horizontally terminating inside of the combustion chamber. The numeral 15 designates a vertical dividing ridge formed out of the refractory lining 12. This ridge is positioned diametrically opposite from the discharge end of the fuel inlet pipe 14 and extends the entire inside height of the combustion chamber. The numeral 16 designates a pit under the boiler 10 and communicating with the inside bottom of the combustion chamber. This pit also communicates with the outside bottom of the boiler housing 10 at each side of the combustion chamber shell 11, as shown in Fig. 2. The numeral 17 designates a continuous inwardly extending ledge or shoulder on the inner side of the pit and near the top of the same, as shown in Fig. 1. The upper side of this ledge may be protected with a refractory lining 18. The numeral 19 designates a compartment in the upper end portion of the boiler housing and spaced apart from the combustion chamber. The numeral 20 designates hot vertical gas flues positioned at each side of the combustion chamber and inside the housing 10. These flues have their lower ends communicating with the inside of the pit 16 and their upper ends communicating with the inside of the compartment 19.

The numeral 21 designates a steam dome in the compartment 19 and having its bottom communicating with a central water compartment 22 of the boiler, as shown in Fig. 1, and is positioned directly above the combustion chamber. The numeral 23 designates the steam outlet pipe communicating with the inside top of the steam dome. The numeral 24 designates a steam gauge communicating with the inside top of the steam dome. The numeral 25 designates a water gauge having its lower end communicating with the inside bottom of the steam dome. The numeral 26 designates a hollow wall or partition inside the compartment 19 and positioned between the steam dome and the forward side of the boiler. This hollow partition has its lower end communicating with the central water compartment 22, as shown in Fig. 1. The numeral 27 designates a plurality of pipes, each having one of their ends communicating with the inside top of the steam dome and their other end communicating with the inside of the partition 26. By this construction, there is no danger of the hot gases in the compartment 19 burning out or warping the partition 26.

The numeral 28 designates a second pit under the boiler housing 10 and positioned in a vertical plane forward of the vertical plane of the combustion chamber, as shown in Fig. 1. The numeral 29 designates a plurality of hot gas flues having their upper ends communicating with the inside of the compartment 19 and their lower ends communicating with the inside of the second pit 28. The numeral 30 designates a plurality of hot gas flues having their lower ends communicating with the inside of the pit 28 and their upper ends communicating with the inside of the compartment 19 forward of the partition 26. By this construction, the rapidly cooling hot gases will pass from the compartment 19 downwardly through the flues 29 and into the pit 28.

From the pit 28 the hot gases will pass upwardly through the flues 30 into the compartment 19 forward of the partition 26. From the compartment 19 forward of the partition 26 the gases may pass from the boiler housing through the stack 31. The numeral 32 designates the water inlet pipe communicating with the inside water compartment 22 of the boiler. By this arrangement, water passing through the pipe 32 will fill the compartment 22, first contacting the flues 30, then the flues 29, and lastly the outside of the combustion chamber and flues 20. Steam from this water will collect in the steam dome 21.

As our steam generator produces an extremely high temperature inside the combustion chamber, it is desirable that the water in the central compartment 22 be circulated in order that it will more closely contact the hot gas flues during the steam producing function. By circulating the water the flues will also last longer and will not warp or burn out, as experienced in ordinary steam boilers. In order to automatically accomplish this desirable circulation of the water we have provided water and steam tubes 33 embedded in the refractory wall 12, as shown in the drawing. These tubes have their lower ends communicating with the inside bottom of the water compartment 22 and their upper ends communicating with the inside of the water compartment 22 near the top thereof, as shown in Fig. 1. The upper ends of these tubes are bent from a vertical to a horizontal in order to throw water and steam to one side of the combustion chamber for agitating the water surrounding the flues. The action of these before mentioned tubes is a natural result of their subjection to exceptionally high temperatures, which causes the water to enter their lower ends and circulate rapidly upwardly and through them.

The water or similar liquid entering the lower end of the tubes 33 is subjected to an intense heat, this intense heat, transmitted to the water, converts it into steam, which is then expelled with great force from the upper end of the tubes into the water contained in the compartment 22 causing a rapid circulation of the liquid in the said compartment.

The numeral 34 designates water legs communicating with the inside bottom of the water compartment 22. These water legs are designed to collect undesirable solid matter settling in the bottom of the water compartment.

From the foregoing, it will readily be noted that we have provided a highly efficient means for circulating water in a steam generator or boiler in order that it may be of the continuous type and capable of permitting the use of extremely high temperatures inside the combustion chamber and making possible the transfer of practically all of the heat units from the hot gases to the water to be reduced to steam.

Some changes may be made in the construction and arrangement of our improved steam generator and means for promoting the circulation of the liquid therein without departing from the real spirit and purpose of our invention, and it is our intention to cover by our claims any modified forms of structure or use of mechanical equivalents which may be reasonably included within their scope.

We claim:
1. In a device of the class described, a housing designed to contain water, a combustion chamber inside said housing having walls of a substantial thickness, passage-ways in the walls of said combustion chamber and in operative communication with the water in said housing.

2. In a device of the class described, a housing having a water compartment, a water supply pipe communicating with the inside of said water compartment, a combustion chamber having walls of substantial thickness and positioned inside said water compartment, flues passing through said water compartment and having one of their ends in operative communication with the inside of said combustion chamber, and a plurality of tubes embedded in the wall of said combustion chamber each having both of their ends a substantial distance apart and terminating inside said water compartment.

3. In a device of the class described, a housing, a combustion chamber inside said housing, a relatively large water compartment inside said housing and surrounding the sides of said combustion chamber, and a plurality of hollow tube members within the walls of said combustion chamber each having their ends communicating with the inside of said relatively large water compartment.

4. In a device of the class described, a housing, a combustion chamber housing inside said housing, a water compartment inside said housing and substantially surrounding the sides and top of said combustion chamber, and a plurality of circulation tubes each having their center portions within the walls of said combustion chamber, their lower ends communicating with the inside of the water compartment at points near the bottom of said water compartment and their upper ends extending a substantial distance above the top of said combustion chamber and communicating with the inside of said water compartment at points above said combustion chamber.

HENRY B. LEWIS,
*Administrator for Wilson L. McLaughlin, Deceased.*

HERROLD L. McLAUGHLIN.
VIRG BALLOU.